US008572297B2

(12) United States Patent
Swindle et al.

(10) Patent No.: US 8,572,297 B2
(45) Date of Patent: Oct. 29, 2013

(54) PROGRAMMABLE SYSTEM-ON-CHIP HUB

(75) Inventors: Scott Allen Swindle, Cardif by the Sea, CA (US); Warren Snyder, Snohomish, WA (US); Drew Marshall Harrington, Oakland, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 113 days.

(21) Appl. No.: 12/060,176

(22) Filed: Mar. 31, 2008

(65) Prior Publication Data

US 2008/0294806 A1    Nov. 27, 2008

Related U.S. Application Data

(60) Provisional application No. 60/912,399, filed on Apr. 17, 2007.

(51) Int. Cl.
*G06F 13/16* (2006.01)
*G06F 13/362* (2006.01)

(52) U.S. Cl.
USPC .............................................. 710/22; 710/113

(58) Field of Classification Search
None
See application file for complete search history.

(56) References Cited

U.S. PATENT DOCUMENTS

| | | | | |
|---|---|---|---|---|
| 5,542,055 A | * | 7/1996 | Amini et al. | 710/306 |
| 5,594,876 A | * | 1/1997 | Getzlaff et al. | 710/113 |
| 6,002,268 A | * | 12/1999 | Sasaki et al. | 326/41 |
| 6,003,107 A | * | 12/1999 | Ranson et al. | 710/316 |
| 6,055,584 A | * | 4/2000 | Bridges et al. | 710/27 |
| 6,253,250 B1 | * | 6/2001 | Evans et al. | 709/253 |
| 6,473,825 B1 | * | 10/2002 | Worley et al. | 710/306 |
| 6,691,193 B1 | * | 2/2004 | Wang et al. | 710/200 |
| 6,745,369 B1 | * | 6/2004 | May et al. | 716/1 |
| 7,305,510 B2 | * | 12/2007 | Miller | 710/305 |
| 7,373,437 B2 | * | 5/2008 | Seigneret et al. | 710/22 |

OTHER PUBLICATIONS

John Mangino, "Using DMA with High Performance Peripherals to Maximize System Performance," 2007, Texas Instruments, pp. 1-23.*
Balough et al, "White Paper: Comparing IP Integration Approaches for FPGA Implementation," Feb. 2007, Ver. 1.1, Altera, pp. 1-7.*
A. F. Harvey, "DMA Fundamentals on Various PC Platforms," 2001, 2004, National Instruments Corporation, pp. 1-19.*
Vixel, "InSpeed SOC 320 embedded storage switch," 2003, Vixel, pp. 1-5.*

* cited by examiner

*Primary Examiner* — Idriss N Alrobaye
*Assistant Examiner* — Dayton Lewis-Taylor (57) ABSTRACT

A Programmable System on a Chip Hub (PHUB) is configured to enable master processing elements within the PHUB to simultaneously access peripherals on different busses. The master processing elements include a Central Processing Unit (CPU) interface configured to decode addresses received from a CPU and configure the PHUB to connect signaling from the CPU to one of the multiple busses associated with the address. A second one of the master processing elements is a Direct Memory Access Controller (DMAC) source engine configured to conduct Direct Memory Access (DMA) reads. A third one of the master processing elements is a DMAC destination engine configured to conduct DMA writes independently of the CPU interface.

18 Claims, 10 Drawing Sheets

PROGRAMMABLE SYSTEM-ON-CHIP HUB

The present application claims priority to Provisional Application No. 60/912,399, filed Apr. 17, 2007 and is herein incorporated by reference in its entirety.

TECHNICAL FIELD

The present disclosure relates generally to programmable devices, and more particularly to a programmable hub.

BACKGROUND

Field-programmable gate arrays (FPGAs) and programmable logic devices (PLDs) have been used in data communication and telecommunication systems. Conventional PLDs and FPGAs consist of an array of programmable elements, with the elements programmed to implement a fixed function or equation. Some currently-available Complex PLD (CPLD) products comprise arrays of logic cells. Conventional PLD devices have several drawbacks, such high power and large silicon area.

In developing complex electronic systems, there is often a need for additional peripheral units, such as operational and instrument amplifiers, filters, timers, digital logic circuits, analog to digital and digital to analog converters, etc. As a general rule, implementation of these extra peripherals create additional difficulties: extra space for new components, additional attention during production of a printed circuit board, and increased power consumption. All of these factors can significantly affect the price and development cycle of the project.

The introduction of Programmable System on Chip (PSoC) chips feature digital and analog programmable blocks, which allow the implementation of a large number of peripherals. A programmable interconnect allows analog and digital blocks to be combined to form a wide variety of functional modules. The digital blocks consist of smaller programmable blocks and are configured to provide different digital functions. The analog blocks are used for development of analog elements, such as analog filters, comparators, inverting amplifiers, as well as analog to digital and digital to analog converters. Current PSoC architectures provide only a coarse grained digital programmability in which a few fixed functions with a small number of options are available.

OVERVIEW

A Programmable System on a Chip Hub (PHUB) is configured to enable master processing elements inside and outside the PHUB to simultaneously access peripherals on different busses (spokes). The master processing elements can include a Central Processing Unit (CPU) interface that configures the PHUB to connect signaling from the CPU to one of the multiple busses. A second master processing element is a Direct Memory Access Controller (DMAC) source engine configured to conduct Direct Memory Access (DMA) reads independently of the CPU. A third master processing element is a DMAC destination engine configured to conduct DMA writes independently of the CPU interface and DMAC source engine. The PHUB connects the CPU and DMAC engines to the peripherals in a single bus cycle without having to buffer information carried over associated connection paths.

The DMAC source engine and DMAC destination engine each determine which peripheral and which bus to access according to addresses contained in programmable Transaction Descriptors (TDs). The CPU interface determines which peripheral and bus to access according to addresses received from the CPU. Each master processing element includes a look-up table that identifies the particular peripheral and bus associated with the CPU or TD address.

The PHUB is programmable to connect to a configurable number of busses, to connect a configurable number of peripherals to the busses, and to configure different address and data word lengths for using over the busses.

Separate arbitration logic is located in each master processing element that separately identifies bus availability. Certain master processing elements can be assigned higher priority levels for particular busses. The arbitration logic pauses devices with lower priority levels causing those devices to stop communicating over a particular bus while the high priority master processing element transfers information. The arbitration logic generates bus access active signals and bus numbers that are used for connecting the master processing elements to busses.

Multiple independently operating bus interface modules are each associated with a different one of the multiple busses. The bus interface circuits ground any of the busses that are not being accessed by one of the master processing elements (pruning). Multiplexers in the bus interface modules selectively connect either the CPU interface, one of the DMAC engines, or ground, to the busses according to signals output from from encoders. A delay circuit prevents the encoders from changing or glitching the output signal while determining which of the CPU interface, DMAC engine, or ground should be connected to the associated buss.

DETAILED DESCRIPTION

Figure 1:
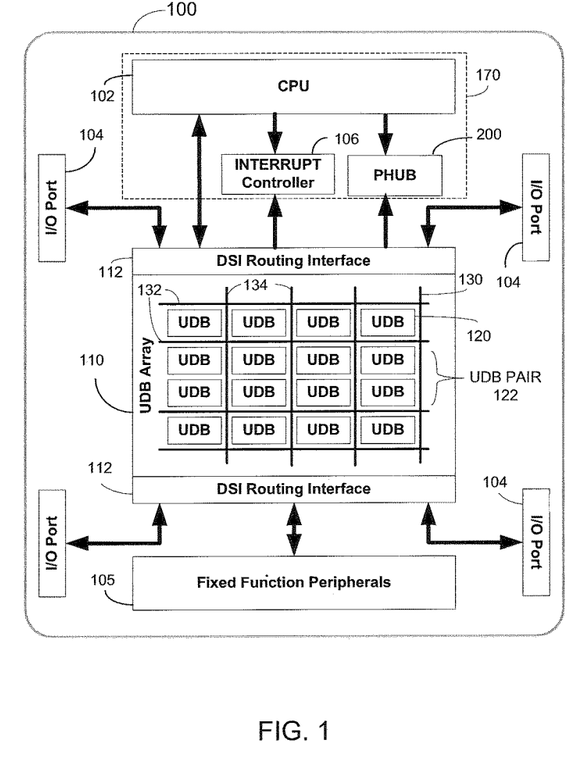
FIG. 1 is a block diagram illustrating an example Programmable System on a Chip (PSoC) architecture.

FIG. 1 is a high level view of a Universal Digital Block (UDB) array 110 contained within a Programmable System on a Chip (PSoC) Integrated Circuit (IC) 100. The UDB array 110 includes a programmable interconnect matrix 130 that connects together the different UDBs 120. The individual UDBs 120 each include a collection of uncommitted logic in the form of Programmable Logic Devices (PLDs) and structural dedicated logic elements.

The UDB array 110 is arranged into UDB pairs 122 that each include two UDBs 120 that can be tightly coupled to a shared horizontal routing channel 132. The UDB pairs 122 can also be programmably connected to the horizontal routing channels 132 of other UDB pairs 122 either in the same horizontal row or in different rows through vertical routing channels 134. The horizontal and vertical routing channels and other switching elements are all collectively referred to as the interconnect matrix 130.

A Digital System Interconnect (DSI) routing interface 112 connects a micro-controller system 170 and other fixed function peripherals 105 to the UDB array 110. The micro-controller system 170 includes a Central Processing Unit (CPU) 102, an interrupt controller 106, and a Programmable System-On-Chip Hub (PHUB) 200. The other peripherals 105 can be any digital or analog functional element in PSoC 100. The DSI 112 is an extension of the interconnect matrix 130 at the top and bottom of the UDB array 110.

Figure 2:
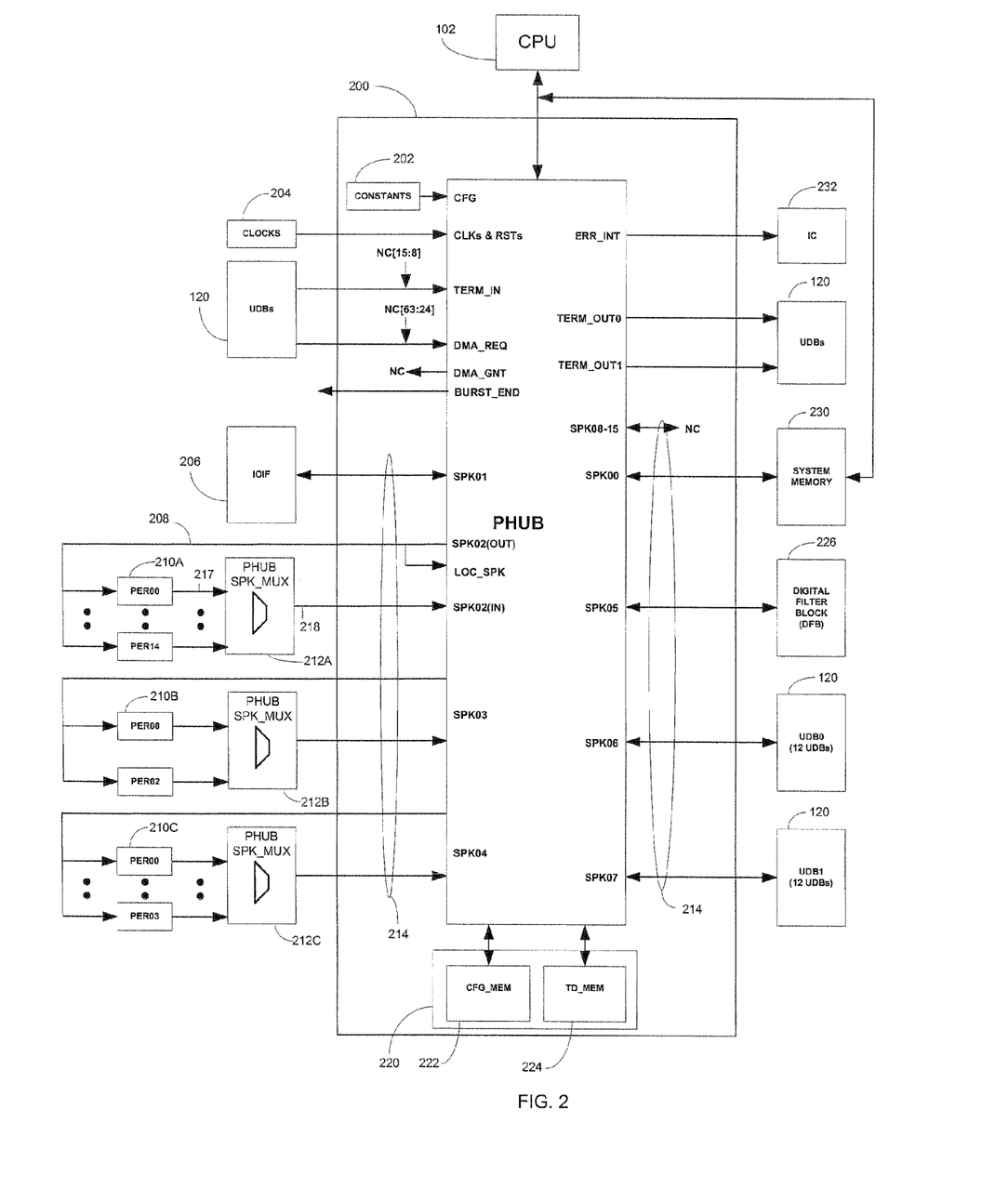
FIG. 2 is a block diagram showing the input/output signals for a PSoC HUB (PHUB) used in the PSoC architecture shown in FIG. 1.

FIG. 2 shows the PHUB 200 in more detail. The PHUB 200 is a programmable central hub within the PSoC device 100 that ties the various on-chip system elements together. The PHUB 200 operates as a central routing resource between the CPU 102, peripherals 105, UDBs 120, and any other processing elements that need to communicate. For explanation purposes, any processing element connected through PHUB 200 will be referred to as a peripheral. The PHUB 200 is also a central routing resource for conducting Direct Memory Accesses (DMAs) between the different peripherals.

The PHUB 200 supports the standard Advanced Microcontroller Bus Architecture (AMBA) Advanced High-Performance Bus (AHB). The PHUB 200 utilizes a multi-layer AHB architecture allowing for simultaneous AMBA-Lite style mastering. By utilizing AMBA standard bus architecture as the basic system bus backbone, the PHUB is easily extensible to incorporate new features in the future. Furthermore, the PHUB 200 can be configured in a number of ways to suit the needs of particular PSoC variants.

In one embodiment, the PHUB 200 is a logic module that is located along with other logic circuitry on a same Integrated Circuit (IC). In this example, the Input/Output (IO) signals shown in FIG. 2 are internal routes formed in the IC. In other embodiments, the PHUB 200 may be a stand-alone IC that has external pins that connect to other external circuitry.

In this example, constant values 202 are shown coupled to one or more configuration inputs (CFG). Clocks 204 are coupled to clock and reset inputs (CLK & RST). An error interrupt signal (ERR_INT) is used for monitoring error conditions on spokes and then reporting the detected errors to another device 232.

The termination signals TERM_IN, TERM_OUT0, and TERM_OUT1 are used for terminating burst transactions. For example, the DMAC 308 in FIG. 3 detects the rising edge of an enabled TERM_IN signal to terminate a burst in process when the TERM_IN signal is enabled by a current Transaction Descriptor (TD). The TERM_OUT signal can be used for signaling interrupts or cueing other logic elements to trigger an event.

The DMA_REQ and DMA_GNT signals are exchanged with peripheral devices that request DMA operations. The DMA_REQ signal is considered during an arbitration against any other DMA_REQ signals that may be active for other DMA channels. The BURST_END signal indicates the end of a burst transaction.

The local spoke signal LOC_SPK is used as feedback and allows the PHUB 200 to configure itself. Typically reconfiguring the PHUB would require interrupting the CPU 102 and having the CPU 102 reconfigure configuration registers. Alternatively, the PHUB 200 can send configuration and status information back to itself via the LOC_SPK signals thus eliminating having to disrupt other PSoC operations.

The LOC_SPK signals connect to any spoke directly to the local memory 220 that contains configuration registers 222 and transaction descriptors. This allows all of the DMAC configuration elements to be accessible either by the CPU 102 or the PHUB 200. The latter allows significant flexibility during a DMA TD chain that contains program instructions for DMAC operations, for copying PHUB status memory, or for reading, modifying or adding to the contents of configuration registers 222, or transaction descriptors 224. In the example shown in FIG. 2, spoke SPK02 is connected to LOC_SPK.

The spokes 214 are separate busses that each include both an input bus and an output bus. In this example, spoke SPK01 is connected to an IO interface 206 and spokes SPK02-SPK04 are each connected to one or more peripherals 210A-2106C, respectively, via PHUB spoke multiplexers 212A-212C, respectively.

The PHUB spoke multiplexers (SPK_MUX) 212 are used remotely from the PHUB 200 to reduce the number of interconnects. For example, 15 peripherals 210A may all need to connect to spoke SPK02. If the multiplexer 212A were located inside of PHUB 200, the spoke buses 217 for each of the 15 different peripherals 210A would have to be routed all the way to PHUB 200.

Alternatively, the external SPK_MUXes 212 are located remotely and relatively close to the locations of the peripherals 210. Thus, only one set of peripheral spoke signals 218 have to be routed between the peripherals 210A and PHUB 200.

Spokes SPK06 and SPK07 are connected to different sets of UDBs 120. For example, SPK06 is connected to a first set of UDBs 120 and SPK07 is connected to a second different set of UDBs 120. A spoke SPK05 is connected to a Digital Filter Block (DFB) 226 and SPK00 is connected to system memory 230. Of course the spokes 214 can be coupled to any other peripheral device that may be connected internally or externally in or with the PSoC 100.

As briefly mentioned above, the local memory 220 may include configuration registers (CFG_MEM) 222 that are used for storing PHUB configuration values. The local memory 220 also contains Transaction Descriptors (TD_MEM) 224 used for programming DMA operations for the DMAC 308 shown FIG. 3.

Figure 3:
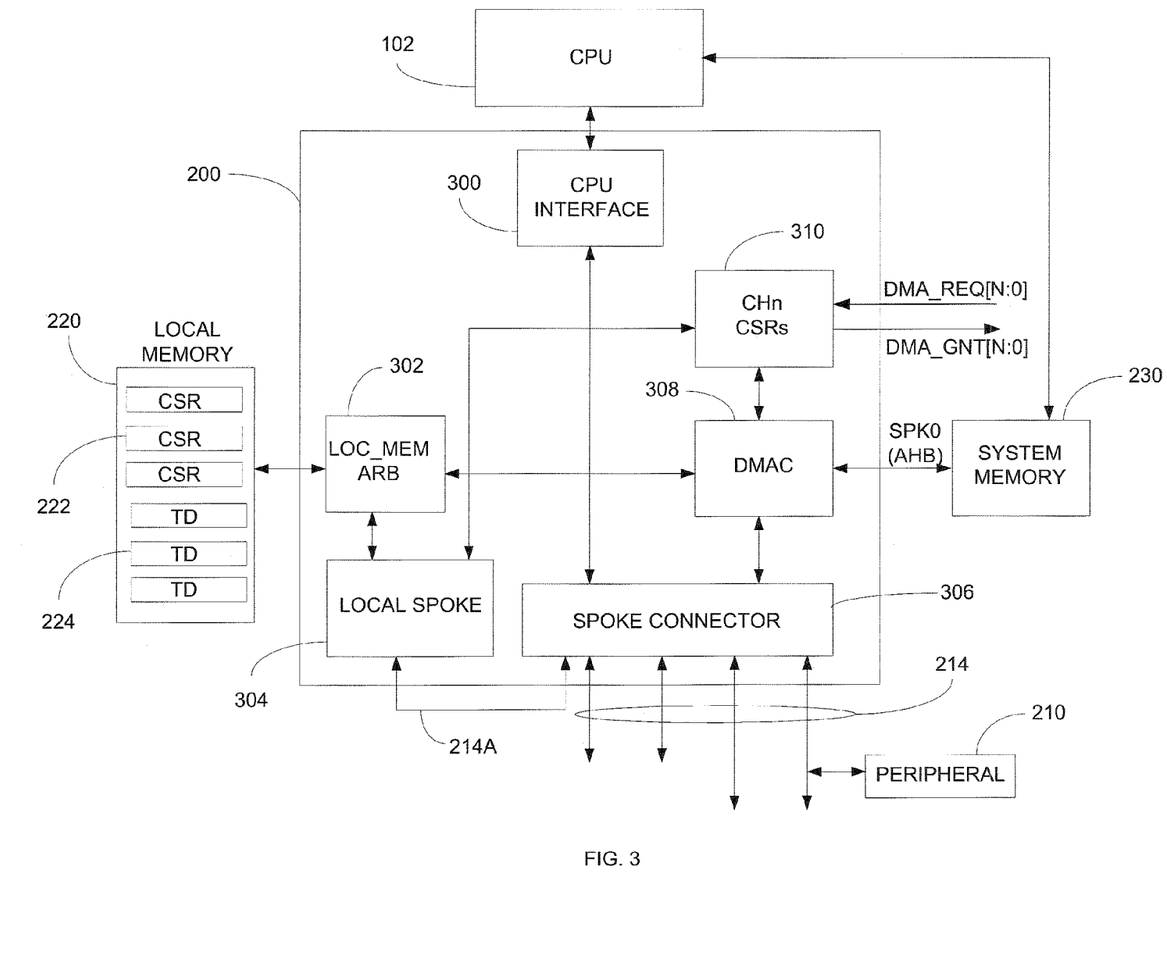
FIG. 3 is a block diagram illustrating the PHUB of FIG. 2 in more detail.

FIG. 3 illustrates the general connectivity between the CPU 102, PHUB 200, System Memory (SYSMEM) 230, Local Memory (LOC_MEM) 220, and one or more spokes 214. As shown in FIG. 3, the PHUB 200 includes a Direct Memory Access Controller (DMAC) 308 that can be programmed to transfer data between different system elements without burdening the CPU 102. The PHUB 200 can be connected to a different peripherals 210, such as FLASH memory, cache, Universal Serial Bus (USB), Ethernet, Controller Area Network (CAN). Of course an almost limitless variety of different peripherals 210 can be connected to PHUB 200. The peripherals 210 may be accessed by the CPU 102 and/or the DMAC 308 through spokes 214. The PHUB 200 also contains logic that performs arbitration between the DMAC 308 and the CPU 102 for access to the spokes 214. The CPU interface 300 provides the communication interface between CPU 102 and PHUB 200.

The configuration and status registers 222 and Transaction Descriptors (TDs) 224 in local memory 220 are used for configuring and programming the PHUB 200. For example, when the CPU 102 wants to program the PHUB 200, the CPU sends TDs 224 through the CPU interface 300 and spoke connector 306 to one of the spokes 214A. The TDs 224 are received by local spoke 304 and loaded into local memory 220. The DMAC 308 then reads the TDs 224 for performing DMA operations.

The spoke configuration is stored statically via Register Transfer Language (RTL) code, but in another embodiment may be dynamically programmed. The DMA channels are configured independently of the spokes through information in CFGMEM 222 and TDMEM 224 (FIG. 2) that in one embodiment are both located in Static Random Access Memory (SRAM) 220. The DMA channels are further configured through configuration and status registers 310 that are implemented as registers within PHUB 200.

Spokes

Typically, a DMAC is connected to a CPU bus and configured by a CPU to take over operation of the CPU bus. The PHUB 200 integrates the DMAC 308 and multiple different busses (spokes) 214 into the same functional module allowing both the CPU 102 and DMAC 308 to operate simultaneously over different spokes 214. The CPU 102 can access a peripheral on a first spoke/bus 214 while the DMAC 308 is conducting direct memory access operations with one or more other peripherals 210 on one or more other spokes 214. Spoke connector circuit 306 controls the connectivity of the CPU 102 and DMA 308 with different spokes 214.

Configurability

Figure 4:
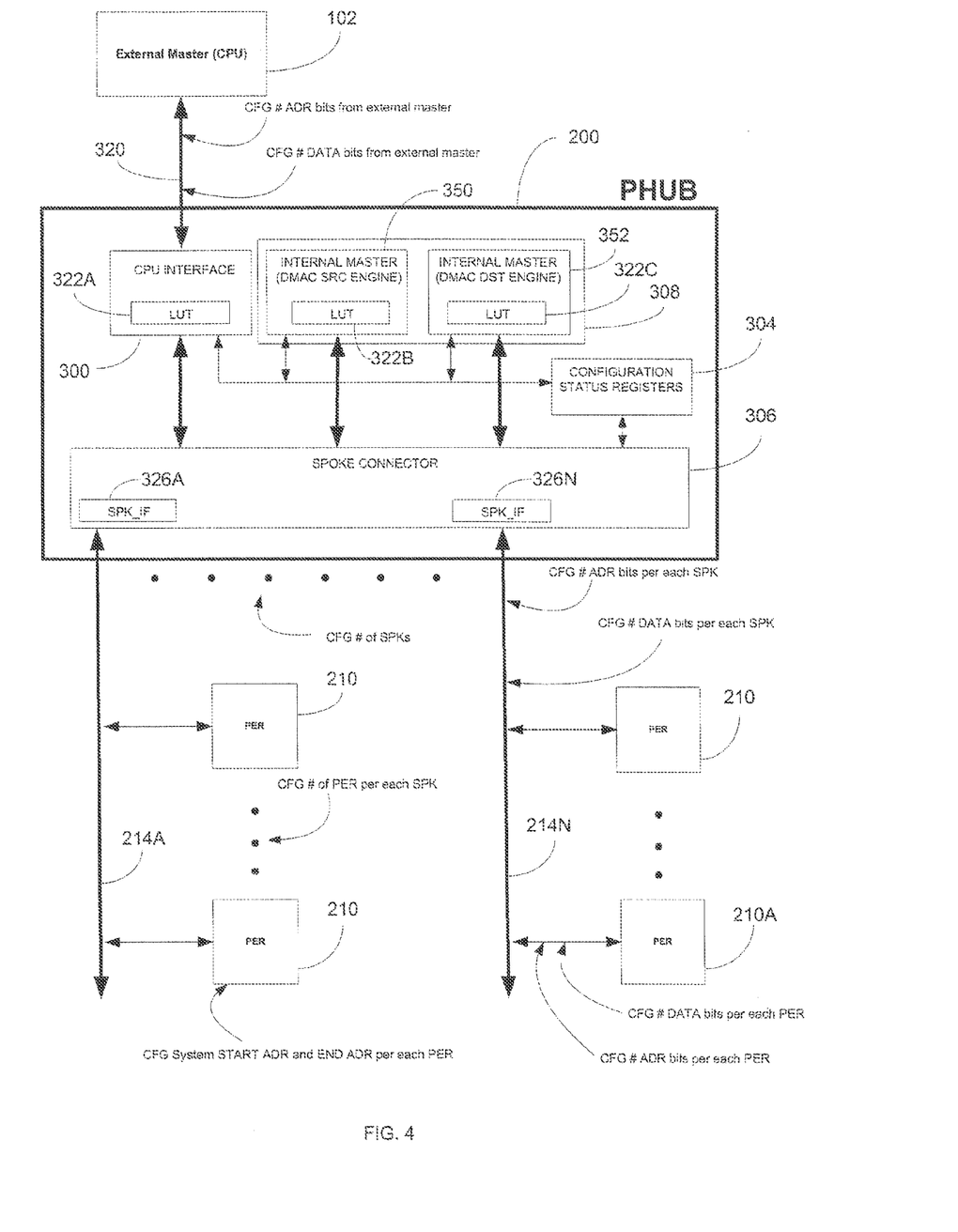
FIG. 4 is a block diagram showing programmability features of the PHUB.

Referring to FIG. 4, the PHUB 200 operates with three different master processing elements. The CPU 102 is a PHUB external master processing element, DMAC source engine 350 is a first PHUB internal master processing element, and a DMAC destination engine 352 is a second PHUB internal master processing element. The DMAC source engine 350 reads data from the peripherals 210 and the DMAC destination engine 352 writes data to the peripherals 210.

A configurable number of address bits and a configurable number of data bits can be transferred over the CPU bus 320 between the CPU 102 and PHUB 200. This allows CPUs operating with different bit lengths to be coupled to the PHUB 200. For example, the PHUB 200 can be configured to operate with either an 8 bit, 16 bit or 32 bit CPU 102. The configuration status registers 222 are loaded with particular values that cause the PHUB 200 to communicate over CPU bus 320 using either 8 bits, 16 bits or 32 bits addresses and data. Of course, other word lengths could also be configured.

The PHUB 200 is also configurable to operate with a selectable number of spokes 214. In one embodiment, 16 different spokes 214 can be configured to operate with the PHUB 200 at the same time. However, any number of spokes may be configured. As explained above, each separate spoke 214 is a separate bus that includes both an input lines and an output lines that operate independently of the other spokes 214.

The configuration status registers 222 can also be programmed to operate with a configurable number of peripherals 210. For example, spoke 214A may be configured to operate with ten different peripherals 210 while spoke 214N may be configured to operate with just one peripheral. Each peripheral 210 is allocated a particular address space in the overall address mapping in PHUB 200.

The configuration status registers 222 can also be programmed to configure the number of address bits and data bits used for each individual spoke 214 and to configure the number of address bits and data bits used with individual peripherals 210. When fewer than the total available number of bus lines for a particular spoke are not required, the non-utilized spoke bus lines can be disable or "turned off". This reduces the number of interconnects and thus also further reduces PHUB power and area utilization.

Each peripheral 210 has an associated starting address and ending address programmed into one or more address Lookup Tables (LUTs) 322. The address LUTs 322 in association with the configuration registers 222, associate addresses with particular peripherals 210 and particular spokes 214 and identify the configurable number of address and data bits used for the individual spokes 214 and individual peripherals 210 on the spokes. The LUTs 322 and configuration status registers 222 can be either statically programmed during Register Transfer Language (RTL) chip fabrication or can be dynamically programmed at initial chip startup via commands sent from the CPU 102.

In one example, the CPU 102 may write data to a particular peripheral 210A on spoke 214N. The address generated on CPU bus 320 is compared with the address values of LUT 322A in CPU interface 300. The matching address in LUT 322A identifies the particular spoke 214N and particular peripheral 210A associated with the address received on CPU bus 320. The CPU interface 300 accordingly sends signals to spoke interface module (SPKIF) 326N that connect signaling from CPU 102 to spoke 214N.

In the example explained above, the CPU 102 may be completely ignorant to the bit lengths used for peripheral 210A. For example, the CPU 102 may be a 32 bit processing device while the peripheral 210A may be an eight bit device. The CPU 102 may send a 32 bit read command to the eight bit peripheral 210A.

The LUT 322A in CPU interface 300 identifies the bit length mismatch between the CPU 102 and peripheral 210A. A state machine in the PHUB 200 may then send four separate eight bit data reads to peripheral 210A. The four eight bit data reads from peripheral 210A are then combined in PHUB 200 and sent to the CPU 102 as a 32 bit data transfer. Alternatively, the software operating in CPU 102 can be written such that eight bit reads and writes are used when communicating with peripheral 210A.

In another embodiment, the configuration status registers 222 can be programmed to completely disable the DMAC 308. In this embodiment, the CPU interface 300 is the only master processing element. The CPU interface 300 simply operates by itself communicating with the different spoke interface modules 326 to connect the CPU 102 to the different peripherals 210 and spokes 214. Each master processing element 300, 350, and 352 operates substantially independently of each other. Thus, programming configuration status registers 304 to disable the DMAC 308 has little or no affect on the operations performed by the CPU interface 300 and spoke connector 306. It should also be understood that there can be more than three master processing elements and there may multiple CPU interfaces 300 that are each coupled to a different CPUs 102.

Connection Transparency

Figure 5:
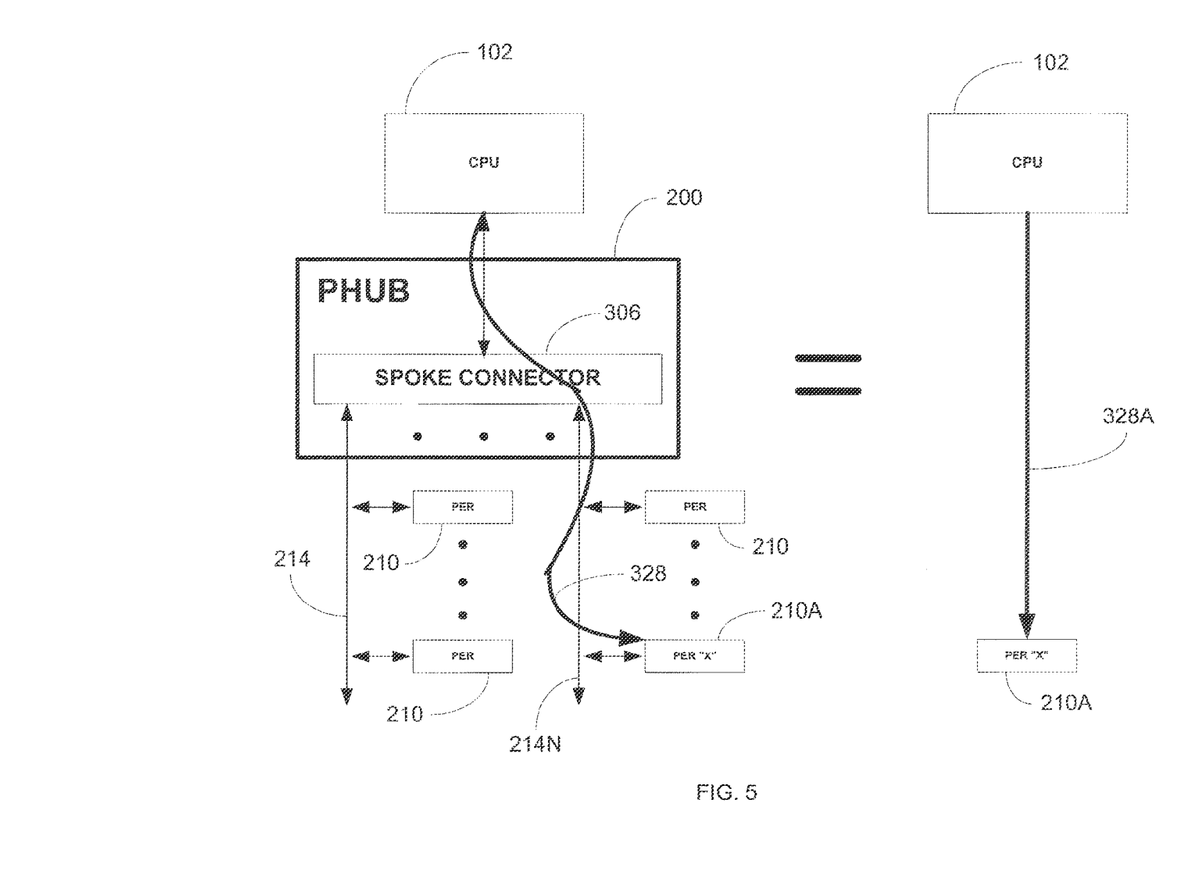
FIG. 5 is a block diagram showing connectivity features of the PHUB.

FIG. 5 shows access transparency provided by the PHUB 200. After the PHUB 200 is configured, a communication path 328 is established through the PHUB 200 between the CPU 102 (or DMAC 308) and a particular peripheral 210A. The communication path 328 provided by PHUB 200 operates effectively as a direct connection between the CPU 102 and peripheral 210A, as if the CPU 102 and peripheral 210A were coupled to the same bus.

This direct connectivity is represented by the second direct connection 328A shown on the right side of FIG. 5. There is no additional signaling, addressing, or bus clocks that have to be performed by the CPU 102 or peripheral 210A in order to communicate with each other. This substantially simplifies both the code and hardware requirements of both the CPU 102 and peripherals 210. This PHUB connection circuitry is described in more detail below.

Further, other than some intermediary buffering that may be performed between the source engine 350 and destination engine 352, the PHUB 200 typically does not buffer information transferred between the CPU and peripherals 210A. Thus, the PHUB 200 does not add additional clock cycles to the communication path 328.

Simultaneous Bus Access

Figure 6:
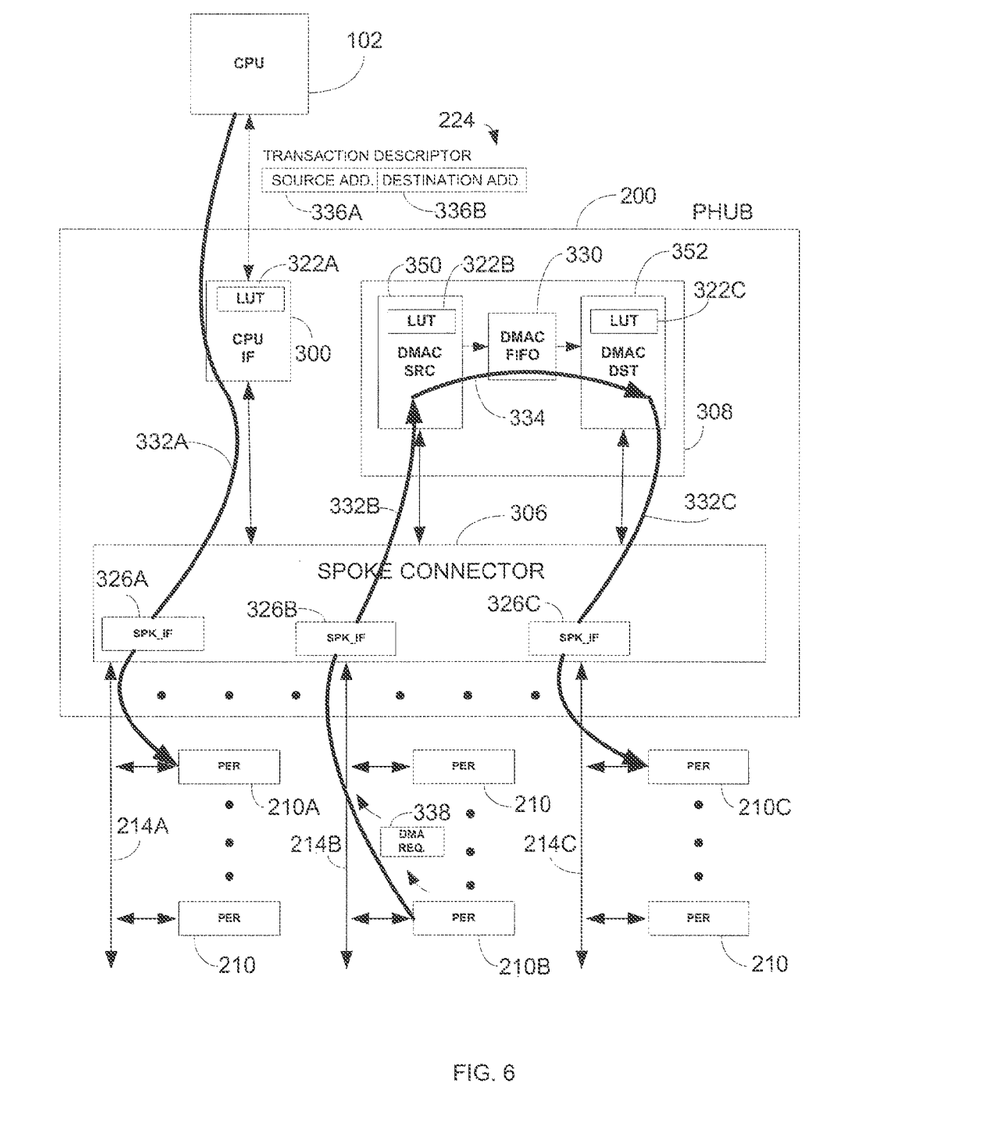
FIG. 6 is a block diagram showing how the PHUB provides simultaneous access to multiple different busses.

FIG. 6 shows how the PHUB 200 provides simultaneous access to multiple different spokes 214 at the same time. The connectivity architecture in the spoke connector 306 allows multiple different communication paths 332 to be established at the same time over different spokes 214. In this example, a first communication path 332A is established between the CPU 102 and a peripheral 210A over spoke 214A. A second communication path 332B is established between the DMAC source engine 350 and peripheral 210B over spoke 214B. A third simultaneous/parallel communication path 332C is also established between the DMAC destination engine 352 and peripheral 210C over spoke 214C.

Since multiple different spoke/busses 214 are provided and operate independently of each other, each master processing element 300, 350, and 352 can communicate over a separate spoke buss 214 at the same time. Further, each separate spoke 214 has an associated spoke interface module 326 that selectively and independently controls which master 300, 350, or 352 is granted access. Thus, each spoke interface 326 can independently establish a communication path 332 over the associated spoke 214 with a particular master 300, 350, and/or 352 without impeding access to the other spokes 214 by the same or other masters 300, 350, and/or 352.

A fly-by DMAC configuration allows the two DMAC engines 350 and 352 to establish a path 334 via a First-In First-Out (FIFO) 330 that bridges communication path 332B with communication path 332C. This bridging feature allows the DMAC 308 to substantially simultaneously burst data between two different peripherals 210B and 210C over two different spokes 214B and 214C.

If only one bus were available, the DMAC 308 in a first data transfer operation would have to read and buffer all of the data read from peripheral 210B. In a second transfer operation, the DMAC 308 would then have to write all of the previously buffered data to peripheral 210C. This two stage process requires more complex connection circuitry, more buffer memory, and also requires longer data transfer times.

Alternatively, the fly-by configuration shown in FIG. 6 uses a relatively small FIFO 330 and a unique combination of a DMAC source engine 350 and independently operating DMAC destination engine 352 to perform DMA transfers between two different peripherals 210. The FIFO 330 is used to exchange data and control information between the DMAC source engine 350 and the DMAC destination engine 352.

For example, the CPU 102 may send TDs 224 that program the DMAC 308 to perform a DMA operation that transfers data from peripheral 210B to peripheral 210C. The TD 224 can contain numerous fields that may include a source address 336A and a destination address 336B. The TD 224 is stored in the local memory 220 shown in FIG. 3.

The DMA operation is then initiated by one of the peripherals or by the CPU on behalf of a peripheral by 214 sending a DMA request 338. The DMA request 338 causes the PHUB 200 to read load the TD 224 from local memory into local configuration registers in the source engine 350 and destination engine 352. The DMAC source engine 350 reads the source address 336A and the DMAC destination engine 350 reads the destination address 336B contained in the TD 224.

The source engine 350 compares the source address 336A with entries in look up table 322B to identify an associated spoke and peripheral for reading data. At the same time, the destination engine 352 compares the destination address 336B with entries in look up table 322C to identify an associated spoke and peripheral for writing data. The source engine 350 and destination engine 352 communicate with spoke interface modules 326B and 326C, respectively, to simultaneously connect to spokes 214B and 214C.

The source engine 350 then reads data from peripheral 210B and writes the data into FIFO 330 via communication path 332B. The destination engine 350 constantly monitors the FIFO 330 for data. Whenever data exists in FIFO 330, the destination engine 350 writes the data from FIFO 330 into the peripheral 210C via communication path 332C. Thus, the source engine 350 can read data from peripheral 210B over spoke 214B and the destination engine 352 can write data to peripheral 210C over spoke 214C at the same time. As mentioned above, the CPU 102 can also at the same time communicate with peripheral 210A over a third communication path 332A.

Spoke Arbitration

Figure 7:
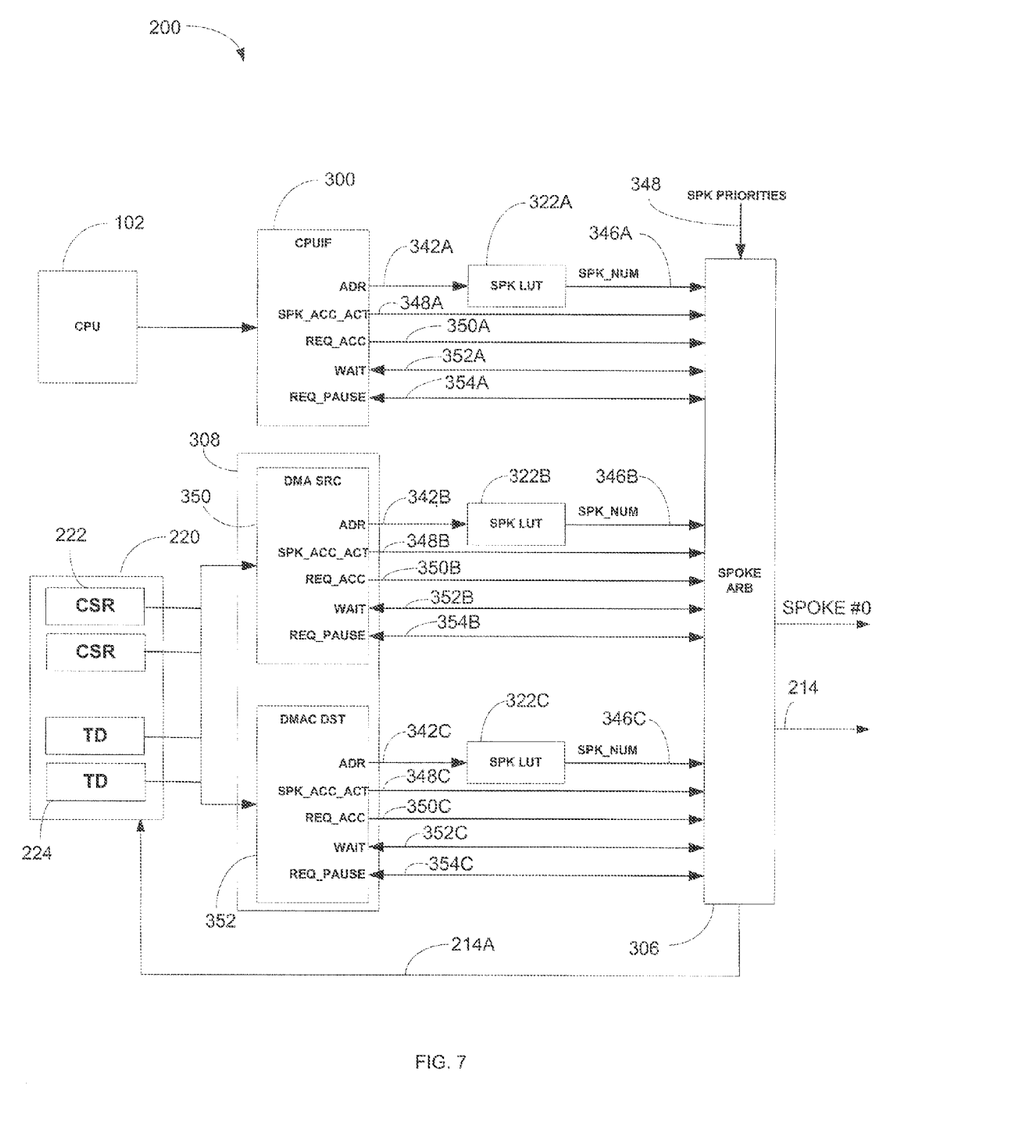
FIG. 7 is a block diagram that shows an arbitration scheme used in the PHUB.

FIG. 7 is a conceptual drawing showing arbitration operations performed in the PHUB 200. It should be understood that that arbitration logic 340 described below may be implemented within individual master processing elements 300, 350 and 352. Further, the spoke lookup tables 322 may each be located within the associated master processing elements 300, 350 and 352. Of course, these operations could equally as well be performed in a central arbitration module as shown in FIG. 7.

The distributed local arbitration described below is advantageous since it allows each master processing elements 300, 350, and 352 to operate independently of each other. Further, the DMAC 308 can be disabled as described above without affecting the normal operation of the CPU interface module 300.

The local memory 220 as previously described above refers to both Configuration Status Registers (CFGs) 222 stored locally in PHUB registers and Transaction Descriptors (TDs) 224 that are typically stored in a Random Access Memory (RAM). Typically the CPU 102 programs the TDs 224 in PHUB 200. However as also mentioned above in FIG. 2, a peripheral 210 or DMAC 308 can also program the PHUB 200 by writing register and TD information into local memory 220 through a spoke 214A that is fed back through a local spoke input.

For example, the CPU 102 may load system memory 230 (FIG. 2) with different DMA structures. Later on, one of the peripherals 210 may want to modify associated DMA transactions. The peripheral 210 could than read one of the stored DMA structures from system memory 230 and write those DMA structures through spoke 214 into local memory 220 utilizing DMA itself to copy the information.

Each master processing element 300, 350, and 352 converts an address (ADR) 342 into a spoke number 346. The spoke number 346 and a spoke access active signal (SPK_ACC_ACT) 348 are then broadcast to each of the other master processing elements. Each master processing element 300, 350, and 352 can send a request access signal (REQ_ACC) 350 and a request pause signal (REG_PAUSE)

354 to both of the other master devices. A wait signal 352 may generated and used internally within each of the master devices 300, 350, and 352.

The address value 342 is fed into the internal spoke look up table 322 to determine the spoke number (SPK_NUM) 346 associated with address 342. The spoke access active signal 348 is generated by the master processing element when no wait signal 352A is generated indicating that the spoke number 346 is currently in use. The master then starts accessing the spoke 214 associated with spoke number 346.

The request access signal 350 is generated when the arbitration function in the master activates the internal wait signal 352. This wait signal 352 indicates the spoke number 346 is already being used by one of the other master processing elements 300, 350, or 352. In this case, the master processing element does not generate the spoke access active signal 348 and start accessing the associated spoke 214 until the local wait signal 352 is de-asserted.

A request pause signal (REQ_PAUSE) is generated according to spoke priority signals 348 that are generated via the configuration registers 222. Particular spokes 214 may have a high priority assigned to either the CPU 102 or DMAC 308. This allows a particular master device to interrupt a lower priority master and take over control of the spoke 214.

For example, assume that spoke #0 is assigned a DMA high priority. Each of the masters 300, 352, and 354 know of the high priority DMA assignment via priority signals 348. Currently, the CPU 102 may be sending data to a peripheral over spoke #0. At the same time, the DMA source engine 350 may have been programmed to read data from one of the peripherals on spoke #0. The DMA source engine 350 generates an address for the peripheral that gets converted by look-up table 322B into a spoke number=0. Accordingly, the DMA source engine 350 generates a wait signal 352B indicating spoke #0 is currently busy.

At the same time, the DMA source engine 350 determines that the master 300 current using spoke #0 has a lower priority than DMA source engine 350. Accordingly, DMA source engine 350 sends a request pause signal 354A and 354B to the CPU interface 300. The request pause signal causes the CPU interface 300 to stop using spoke #0 and de-assert the spoke access active signal 348A. This causes the DMA source engine 350 to de-assert the wait signal 352B, generate the spoke access active signal 348B, and immediately start reading data from a peripheral over spoke #0. This further causes the CPU interface 300 to activate internal wait signal 352A.

As soon as the DMA source engine 350 completes the data transfer, spoke access active signal 348B is deactivated allowing the CPU interface 300 to de-assert the wait signal 352A, reassert the spoke access active signal 348A, and resume sending data over spoke #0.

Figure 8:
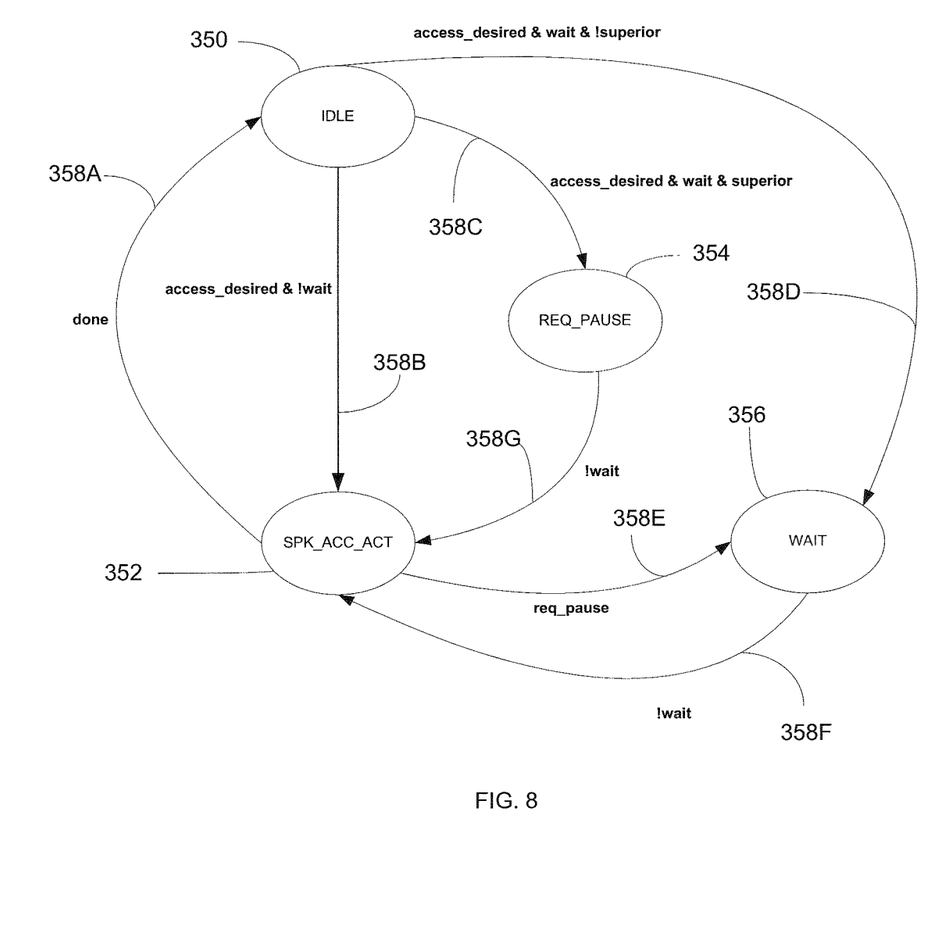
FIG. 8 is a state diagram further explaining the arbitration scheme shown in FIG. 7.

FIG. 8 is a state diagram showing how a master device operates during an arbitration condition. The master processing element 350, 350, or 352 in state 350 is idle and not connected to a spoke. If access to a particular spoke is desired and the wait signal for that spoke is not active in state 358B, then the master moves into the spoke access active state 352, generates the spoke access active signal, and starts using the spoke. If the communication is completed in operation 358A, the master moves back to idle state 350 and removes the spoke access active signal. If a request pause condition 358E is received while in state 352, the master moves into wait state 356.

In idle state 350, if access to a spoke is desired, the wait signal is activated, and the master is superior in condition 358D, the master goes into request pause state 354. The master stays in request pause state 354 until the wait signal is de-asserted. The master then moves into spoke access active state 352.

While in idle state 350, if access to a spoke is desired, the wait signal is activated for that spoke, but the master is not superior in operation 358D; the master goes into wait state 356. Once the wait signal is de-asserted, the master moves into the spoke access active state 352.

Connectivity and Pruning

Figure 9:
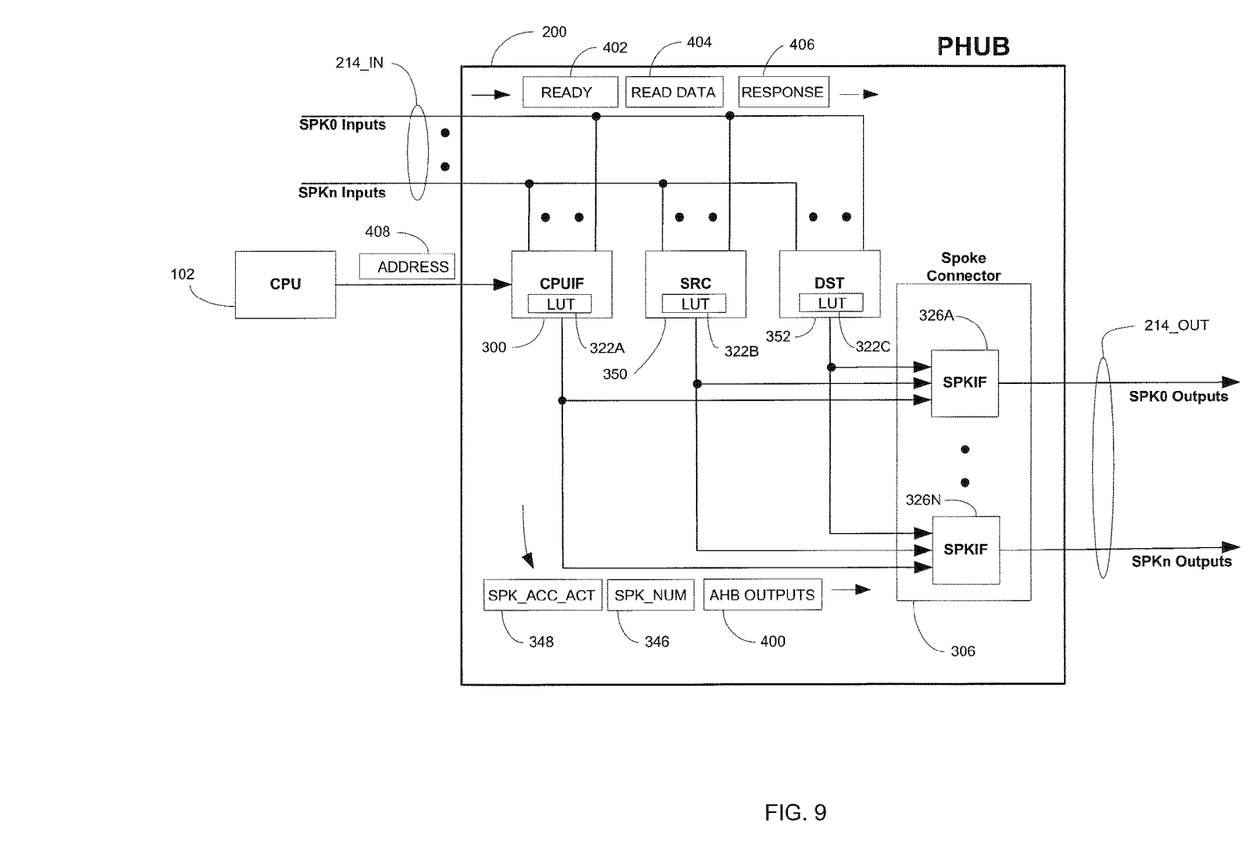
FIG. 9 is a schematic diagram that shows how master processing elements in the PHUB are connected to different spokes.

FIG. 9 shows inter-connectivity between some of the functional elements in the PHUB 200 in more detail. Each spoke 214 includes an input spoke bus 214_IN and an output spoke bus 214_OUT. Each master processing element 300, 350, and 352 is coupled to each input spoke bus 214_IN and coupled to each output spoke 214_OUT through the associated spoke interface modules 326. As mentioned above, each spoke 214 has an associated spoke interface module 326.

For AHB bus signaling, the input spokes 214_IN may carry a ready signal 402, read data signal 404, and/or a response signal 406. Based on the received inputs on input spokes 214_IN, the PHUB configuration, and the information from CPU 102; the master processing elements 300, 350, and 352 may generate the spoke access active signal 348 and spoke number 346 previously discussed above in FIG. 8 and also output AHB output signaling 400. The AHB output signaling 400 may include a peripheral select signal, address, direction signal, size signal, and/or write data.

In one example, the CPU 102 sends an address 408 to the CPU interface 300. The CPU interface 300 determines which spoke and peripheral to access by comparing the address 408 with entries in look-up table 322A. The information 348, 346, and 400 is then output to the spoke interface 326 associated with the identified spoke 214. The associated spoke interface 326 connects the AHB output signaling 400 for the master device 300 to the associated spoke 214. The CPU interface 300 then receives/multiplexes in the input signals 402, 404, and/or 406 for the corresponding peripheral over the input spoke bus 214_IN corresponding to address 408.

The DMAC source and destination engines 350 and 352, respectively, operate the same way as the CPU interface 300 only use the source and destination addresses in the transaction descriptors 312 in local memory 224 (FIG. 7) for identifying the associated peripherals and spokes for conducting DMA operations. The source address in the TD 224 is used by the DMAC source engine 350 for identifying the peripheral and spoke used for reading data. The destination address in the TD 224 is used by the DMAC destination engine 352 for identifying the peripheral and spoke for writing data.

Figure 10:
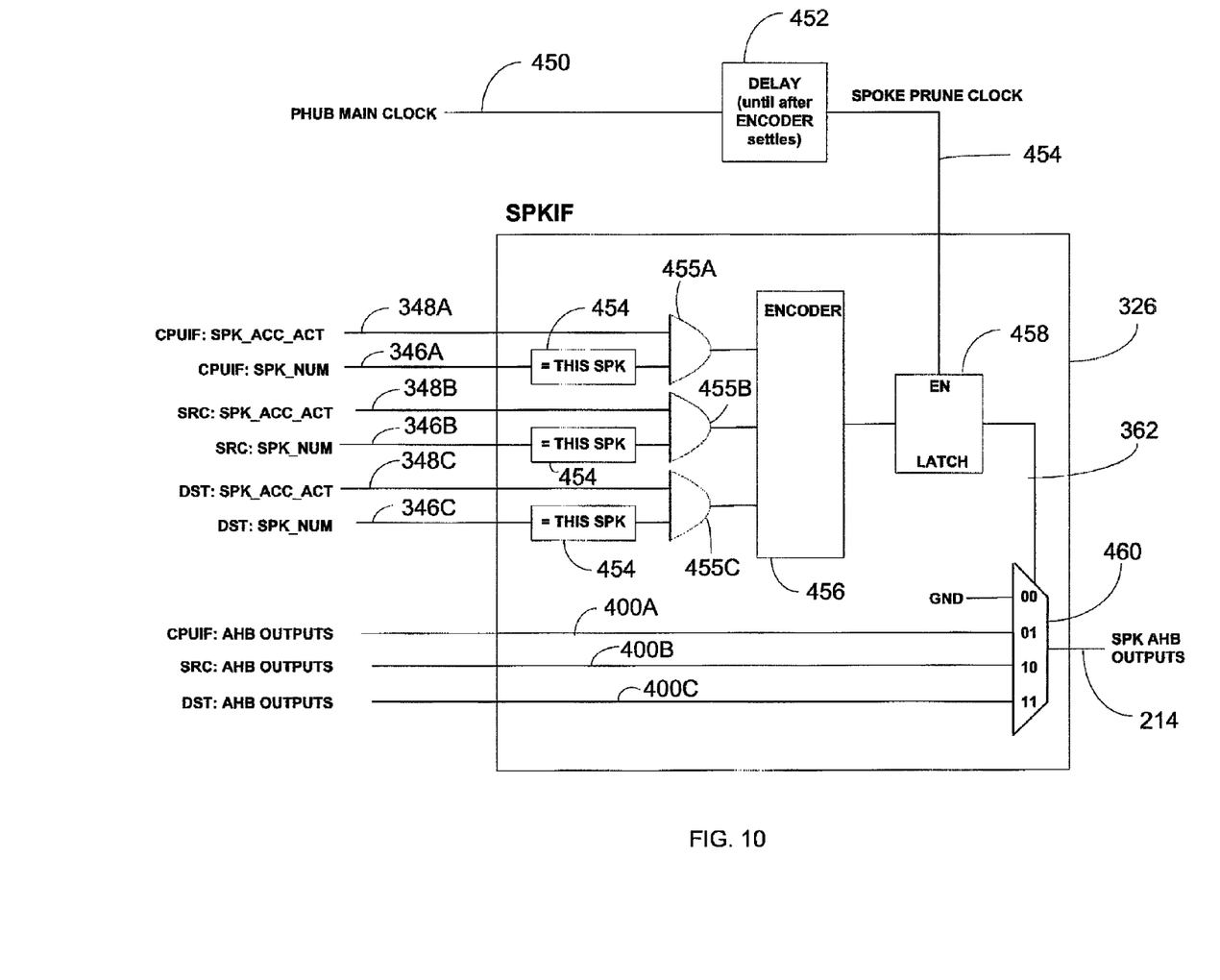
FIG. 10 is a diagram showing a spoke interface module in more detail.

FIG. 10 shows one of the spoke interface modules 326 in more detail. The spoke access active signal 348 and the spoke number signal 346 for each of the master processing elements 300, 350 and 352 are received by each spoke interface 326. If the spoke number 346 for one of the master processing elements matches the spoke number 454 associated with that particular spoke interface 326, the encoder 456 generates a corresponding value 462 for inputting into multiplexer 460. For example, if the spoke access active signal 348B was activated and the spoke number 346B corresponds with the spoke number 454, AND gate 455B is asserted. The encoder 456 accordingly generates a binary [10] value on line 462 causing multiplexer 460 to connect the AHB output signals 400B from the DMAC source engine 350 to spoke bus 214.

Pruning refers to powering down spokes 214 that are currently not being used. Signal transmissions to unused spokes 214 are driven to ground via multiplexer 460 to reduce power usage. For example, if none of the outputs for AND gates 455A-455C are activated, the encoder 456 generates a binary [00] value that drives spoke 214 to ground.

The spoke interface circuit 326 also allows the master processing elements 300, 350 and 352 and CPU 102 to transfer information through the PHUB 200 in the same access bus cycle. At the beginning of the PHUB main clock 450, the CPU 102 generates an address. If one of the master processing elements enable spoke interface 326, the outputs for that master will be connected to the spoke 214 by the end of that same clock cycle 450.

If the output of encoder 456 were connected directly to the multiplexer 460, power glitches could occur on spoke 214 every time the encoder 456 tries to determine what master device, if any, to connect to spoke 214. To keep the signals on spoke 214 stable, a delay circuit 452 is used in combination with a latch 458. The delay circuit 452 delays the clock signal 450 long enough for the encoder 456 to settle on a particular master connection or ground connection to spoke 214. After the encoder settles, the output of delay circuit 452 enables the latch 458 to latch the output value from encoder 456. If the current value of latch 456 does not change, the connection state of multiplexer 460 remains the same. The spoke 214 may have been grounded (pruned) during a previous clock cycle because no masters accessed spoke 214. The delay circuit 452 and latch 458 keep spoke 214 grounded and eliminates glitching until one of the masters 300, 350, or 352 access spoke 214.

For the sake of convenience, the operations are described as various interconnected functional blocks or distinct software modules. This is not necessary, however, and there can be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Steve, did the above paragraph accidentally get thrown in from perhaps the udb patents? Or is this just standard language for covering as much scope as possible in this type of application?

Having described and illustrated the principles of the invention in a preferred embodiment thereof, it should be apparent that the invention can be modified in arrangement and detail without departing from such principles. Claim is made to all modifications and variation coming within the spirit and scope of the following claims.

What is claimed is:

1. A connection hub, comprising:
one or more master processing elements;
multiple different separately accessible busses;
a bus connection circuit configured to enable the master processing elements to access any of the different busses simultaneously;
multiple independently operating bus interface circuits each associated with a different one of the multiple busses, wherein the bus interface circuits are configured to reduce power consumption by the busses that are not being accessed by one of the master processing elements by powering down the busses that are not being accessed based on a first signal identifying the at least one of the busses and a second signal indicating whether the at least one of the busses is active, wherein the first signal and the second signal are generated by one of the master processing elements, and wherein the bus interface circuits are further configured to power up the at least one of the busses in response to determining that the at least one of the busses is being accessed by one of the master processing elements; and
a configuration memory configured to store configuration values for the bus connection circuit and the multiple independently operating bus interface circuits.

2. The connection hub according to claim 1 wherein one or more of the master processing elements is a Central Processing Unit (CPU) interface configured to decode an address received from a CPU and configure the bus connection circuit to connect signaling received from the CPU to one of the multiple busses associated with the address.

3. The connection hub according to claim 1 wherein a first one of the master processing elements is a Direct Memory Access Controller (DMAC) source engine configured to conduct Direct Memory Access (DMA) reads from peripheral devices connected to the busses and a second one of the master processing elements is a DMAC destination engine configured to conduct DMA writes to peripheral devices connected to the busses.

4. The connection hub according to claim 3 further comprising a first-in first-out (FIFO) coupled between the DMAC source engine and the DMAC destination engine configured to transfer data read by DMAC source engine from one of the peripherals to the DMAC destination engine for writing to one of the peripherals.

5. The connection hub according to claim 3 wherein the DMAC source engine and DMAC destination engine each determine which peripherals and which busses to access according to addresses contained in programmable transaction descriptors.

6. The connection hub according to claim 1 wherein the master processing elements include look-up tables that identify particular peripherals and busses associated with received address values.

7. The connection hub according to claim 1 further comprising configuration registers that programmably determine how many busses are coupled to the connection hub, the number of peripherals connected to the busses, and the word lengths of addresses and data transferred over the busses.

8. The connection hub according to claim 1 wherein the bus connection circuit establishes connection paths between the master processing elements and peripherals on the busses in a single bus cycle without ever buffering information carried over the connection paths.

9. The connection hub according to claim 1 further comprising a multiplexer configured to force unused busses to static zero values.

10. An apparatus, comprising:
a Central Processing Unit (CPU) interface configured to communicate with a CPU;
a Direct Memory Access Controller (DMAC) configured to conduct Direct Memory Accesses (DMAs) independently of the CPU;
a bus connection circuit coupled to multiple different separately accessible busses and configured to couple the CPU and the DMAC to any of the different busses at the same time, and configured to reduce power consumption by the busses that are not being accessed by the CPU or DMAC by powering down the busses that are not being accessed based on a first signal identifying at least one of the different busses and a second signal indicating whether the at least one of the different busses is active, wherein the first signal and the second signal are generated by one of the CPU or the DMAC, and further configured to power up the at least one of the busses in response to determining that the at least one of the busses is being accessed by the CPU or the DMAC; and a configuration memory configured to store configuration values for the bus connection circuit.

11. The apparatus according to claim 10 wherein the CPU interface and the DMAC each include separate arbitration configured to separately identify available busses and configure the bus connection circuit to establish connections between the CPU interface or DMAC and the available busses.

12. The apparatus according to claim 11 wherein the CPU interface and the DMAC are assigned higher priority levels for different associated busses and the arbitration logic in the CPU interface and DMAC is configured to send request pause signals to other devices with lower priority levels that are using the associated busses, the request pause signal causing the other devices to stop communicating over the associated busses so the CPU interface or DMAC can transfer information over the associated busses.

13. The apparatus according to claim 11 wherein the arbitration logic in the CPU interface and the DMAC generates bus access active signals and bus numbers associated with the busses, the bus access active signals and bus numbers used by the bus connection circuit for connecting the CPU interface and DMAC to the busses associated with the bus number.

14. The apparatus according to claim 13 further comprising bus interface circuits associated with each of the busses, the bus interface circuits connecting one of the CPU interface or DMAC to the associated busses according to the bus access active signals and the bus numbers received from the CPU interface and the DMAC.

15. The apparatus according to claim 10 wherein the bus connection circuit includes:
encoders that generate output signals that identify which of the CPU interface, DMAC, or ground to connect to associated busses;
multiplexers that selectively connect either the CPU interface, the DMAC, or ground to the associated busses according to the output signals from the encoders; and
a delay circuit that prevents the encoders from changing or generating glitches on the output signal while the encoders determine which of CPU interface, DMAC, or ground to connect to the associated busses.

16. A programmable system on chip, comprising:
a Central Processing Unit (CPU);
a plurality of different busses;
different peripheral devices;
a hub that is configured to programmably couple the CPU to different peripheral devices over at least one of any of the multiple different busses, and to reduce power consumption by the multiple busses by powering down any of the multiple busses that are not coupled to the CPU or to different peripheral devices based on a first signal identifying the at least one of the plurality of different busses and a second signal indicating whether the at least one of the plurality of different busses is active, wherein the first signal and the second signal are generated by the CPU or by one of the different peripheral devices, and to power up the at least one of the multiple busses in response to determining that the at least one of the multiple busses is being coupled to the CPU or to the different peripheral devices; and
a configuration memory configured to store configuration values for the hub.

17. The programmable system on a chip according to claim 16 wherein the hub further comprises:
a Direct Memory Access Controller (DMAC) source engine configured to conduct read operations with the different peripherals over the different busses independently from the CPU; and
a separate DMAC destination engine configured to conduct write operations with the different peripherals over the different busses independently from the CPU and DMAC source engine.

18. The programmable system on a chip according to claim 17 further comprising:
an array of digital blocks; and
a programmable interconnect matrix including horizontal channels that programmably couple different groups of one or more digital blocks together and segmentation elements that programmably interconnect different horizontal channels together, the hub programmably coupling the CPU, the DMAC source engine, and the DMAC destination engine to the digital blocks.

* * * * *